United States Patent [19]

Newton et al.

[11] 4,368,295

[45] Jan. 11, 1983

[54] FILMS FROM COMPOSITIONS OF POLYESTERS AND OLEFINE POLYMERS

[75] Inventors: Alan B. Newton, Welwyn Garden City; Eric Nield, Watton-At-Stone; Vir B. Singh, Kimpton, all of England

[73] Assignee: Imperial Chemical Industries Limited, London, England

[21] Appl. No.: 276,249

[22] Filed: Jun. 22, 1981

[30] Foreign Application Priority Data

Jul. 17, 1980 [GB] United Kingdom ............... 8023364

[51] Int. Cl.$^3$ ................... C08L 23/30; C08L 67/02; C08L 23/02
[52] U.S. Cl. ................................. 525/166; 525/64; 525/92; 525/176; 525/177
[58] Field of Search ........................ 525/166, 64, 92

[56] References Cited

U.S. PATENT DOCUMENTS 3,944,699  3/1976  Mathews et al. .................. 525/177
4,219,628  8/1980  Weemes et al. .................... 525/166

*Primary Examiner*—Carman J. Seccuro
*Attorney, Agent, or Firm*—Cushman, Darby & Cushman

[57] ABSTRACT

An opaque or translucent molecularly oriented film made from a composition comprising at least one linear polyester (preferably polyethylene terephthalate) and 0.5–100% by weight based on polyester of at least one olefine polymer, wherein said composition contains at least one carboxylated polyolefine in an amount of 0.05–50% by weight based on olefine polymer. The composition used for the film is preferably formed by precompounding the olefine polymer and carboxylated olefine and then mixing with the polyester.

9 Claims, No Drawings

FILMS FROM COMPOSITIONS OF POLYESTERS AND OLEFINE POLYMERS

The present invention relates to films made from certain compositions containing linear polyesters and olefine polymers.

It has been proposed in the literature, for example in U.S. Pat. No. 3,944,699, to produce opaque or translucent biaxially stretched linear polyester films by incorporating polyethylene or polypropylene into the polyester, the opacity or translucence resulting from voiding which occurs between the regions of the polyester and olefine polymer during the stretching operation. Such films are of utility in a variety of applications, e.g. as a paper substitute (in view of their paper-like texture) and particularly photographic printing paper, as a base for carbon paper and carbon ribbon for use in typewriters, in applications where very high speed printing of tape is required, in textile threads where the decorative appearance of the films is useful, in magnetic recording tape, and in cable wrapping.

It has been our experience, however, that the olefine polymers do not disperse particularly well in linear polyesters so that if one makes opaque or translucent oriented films from linear polyester/olefine polymer blends, the opacity or translucence occurs in streaks, separated by clear regions, unless the olefin polymer is incorporated into the polyester at the polymerisation stage which is disadvantageous because of the requirement to provide an injection facility for the olefine polymer and because the olefine polymer tends to degrade during the polyester work-up.

We have now found that the dispersability of olefine polymers in linear polyesters can be significantly improved by the incorporation of a certain additive into the composition whereby much more uniformly opaque or translucent films may be produced without the necessity of incorporating the olefine polymer at the polymerisation stage to produce the polyester.

According to the present invention there is provided an opaque or translucent molecularly oriented film made from a composition which comprises at least one linear polyester and 0.5–100% by weight, preferably 0.5–50% by weight, based on the weight of polyester of at least one olefine polymer, wherein said composition contains at least one carboxylated polyolefine in an amount of 0.05–50% by weight, preferably 0.5–20% by weight, based on the weight of olefine polymer.

The linear polyester may be produced by condensing one or more dicarboxylic acids or a lower alkyl diester thereof, e.g. terephthalic acid, isophthalic acid, phthalic acid, 2,5-, 2,6- or 2,7-napthalene dicarboxylic acid, succinic acid, sebacic acid, adipic acid, azelaic acid, bibenzoic acid and hexahydroterephthalic acid, or bis-p-carboxyphenoxyethane, with one or more glycols, e.g. ethylene glycol, 1,3-propanediol, 1,4-butanediol, neopentyl glycol and 1-4-cyclohexanedimethanol. The preferred polyester is polyethylene terephthalate.

The polyester may be a copolymer containing mixed hydroxylic and/or ester forming acidic groups, and may be a block copolymer formed from different polyesters. The copolyester may contain polymeric segments having a glass-transition temperature of less than 0° C. so that the polyester is internally plasticised. The polymer used for the polymeric segment must be capable of undergoing polycondensation with the segments of the polyester though reactive end groups such as hydroxyl or carboxyl groups or of being linked to polyester segments by the use of chain extenders. Typically suitable polymeric segments are polyethylene glycol and polytetramethylene glycol with the polyester segment typically being polyethylene terephthalate or polybutyl terephthalate.

Suitable olefine polymers for use in the invention include low and high density olefine homopolymers such as polyethylene, polypropylene and poly-4-methylpentene. Olefine copolymers, which may be based on an olefine and a different type of monomer, or a mixture of olefines (e.g. ethylene/propylene copolymers) may also be used. The copolymers may be random, block or graft copolymers. Mixtures of olefine homopolymers and/or olefine copolymers may also be used. It is to be understood that the olefine polymer is not carboxylated.

The carboxylated polyolefine (preferably a carboxylated polyethylene) is preferably prepared by the oxidation of a polyolefine homopolymer (preferably a polyethylene homopolymer) with an oxidising agent; this introduces carboxyl groups onto the polyolefine chain. Alternatively the carboxylated polyolefine may be prepared by copolymerising an olefine (preferably ethylene) with an olefinically unsaturated acid or anhydride such as acrylic acid, maleic acid or maleic anhydride. The carboxylated polyolefine may, if desired, be partially neutralized. Suitable carboxylated polyolefines include those polymers having a Brookfield Viscosity (140° C.) in the range 150–100,000 cps (preferably 150–50,000 cps) and an Acid Number in the range 5–200 mg KOH/g (preferably 5–50 mg KOH/g). The acid number is the number of mg of KOH required to neutralise 1 g of polymer.

The films of the invention are molecularly oriented, and preferably biaxially oriented. The films may be produced by conventional melt extrusion techniques. The films are preferably ones which have been heat set by processes known in the art for the orientation and heat setting of extruded polyethylene terephthalate films. The oriented films become translucent or opaque as a consequence of voiding which occurs between the linear polyester and olefine polymer phases during the stretching of the films. The degree of translucency or opacity is determined by the concentration of the olefine polymer and the thickness of the film.

Applications for the films of the invention include those mentioned above and also single web packaging, use in laminates (e.g. coffee packs), and identity cards.

The components for the compositions used for the films of the invention may be mixed together by any conventional manner. For example, the components may be blended by tumble or dry mixing or by compounding—by which is meant melt mixing e.g. on 2-roll mills, in a Banbury mixer or in an extruder, followed by cooling and, usually, comminution into granules or chips. The olefine polymer and carboxylated polyolefine components may also be incorporated at the polyester polymerisation stage, although, as indicated above, this is not recommended.

In a preferred embodiment of the invention, the film of the invention is made from a composition prepared by a method in which the carboxylated polyolefine has been precompounded with the olefine polymer before admixture with the polyester, preferably by melt mixing, cooling and comminution into granules or chips. (Melt mixing may be efficiently performed using screw extruders having length to diameter ratios of at least 15:1 or internal mixers for example as described in Chaper 15 of the book "Polythene" 2nd Edition edited by A. Renfrew and P. Morgan and published in 1960 by Illiffe of London). This affords a still further improvement in the uniformity of translucent or opaque voided molecularly oriented films according to the invention.

Accordingly there is further provided according to the invention an opaque or translucent molecularly oriented film made from a composition as defined above, wherein to form the composition used for the film the at least one olefine polymer and the at least one carboxylated polyolefine are precompounded and then mixed with the at least one linear polyester.

The invention is now illustrated by the following Examples.

EXAMPLES 1 TO 8

Film-forming compositions were prepared by tumble blending polyethylene terephthalate granules (intrinsic viscosity 0.65 measured at 25° C. in o-chlorophenol as a 1% weight/volume solution), polypropylene granules (melt flow index 22 measured by the method in BS 2782:105C), and, in Examples 3 to 8 only, a carboxylated polyethylene ('AC' Polyethylene 316A, an oxidised polyethylene sold by Allied Chemical Corporation, and said by the manufacturer to have a Brookfield Viscosity of 3000 cps and an Acid Number of 16 mg KOH/g). The amounts used are shown in Table 1. In Examples 3 to 5, the carboxylated polyethylene was added (as powder) independently of the polyethylene terephthalate and polypropylene, while in Examples 6 to 8 it was added precompounded with the polypropylene (by melt extrusion mixing, cooling and comminution into granules).

TABLE 1

| Composition (parts by weight) | Ex. 1 | Ex. 2 | Ex. 3 | Ex. 4 | Ex. 5 | Ex. 6 | Ex. 7 | Ex. 8 |
|---|---|---|---|---|---|---|---|---|
| Polyethylene Terephthalate | 95 | 90 | 95 | 95 | 90 | 90 | 90 | 90 |
| Polypropylene | 5 | 10 | 5 | 5 | 10 | 9.9 | 9.8 | 9 |
| Carboxylated Polyethylene | — | — | 1 | 2 | 2 | 0.1 | 0.2 | 1 |

The compositions were extruded in the form of film and rapidly quenched to render the polyethylene terephthalate component amorphous. Each film was stretched sequentially at a draw ratio of 3.5/1 in the longitudinal and transverse directions at a temperature of 105° C.; the films were heat set at about 210° C. The thickness of these films was in the range 15–30 μm.

The visual quality and density of the resulting films are shown in Table 2.

TABLE 2

| Example Number | Visual Quality of Dispersion | Density (g/cm³) |
|---|---|---|
| 1 | Patchy streaks of clear and translucent areas | 1.25 |
| 2 | Patchy streaks of clear and translucent areas | 1.21 |
| 3 | Distinct improvement over Examples 1 and 2. Much reduced patchiness but translucence still not perfectly uniform | 1.25 |
| 4 | Distinct improvement over Examples 1 and 2. Much reduced patchiness but translucence still not perfectly uniform | 1.25 |
| 5 | Distinct improvement over Examples 1 and 2. Much reduced patchiness but translucence still not perfectly uniform | 1.20 |
| 6 | Perfectly uniformly translucent film | 1.03 |
| 7 | Perfectly uniformly translucent film | 1.04 |
| 8 | Perfectly uniformly translucent film | 0.93 |

It is seen from the results in Table 1 that the inclusion of carboxylated polyethylene into the composition afforded a distinct improvement in the dispersion of the polypropylene in the polyethylene terephthalate. It will be noted (by comparing Examples 3 to 5 with Examples 6 to 8) that the maximum improvement in dispersion was obtained when the carboxylated polyethylene was precompounded with the polypropylene before blending with the polyethylene terephthalate. The use of the precompounding technique in Examples 6 to 8 resulted in a significant lowering in the density obtained, implying extremely uniform voiding by the film. Such lowering in density could give a considerable price advantage. Possible applications for such films include single web packaging, and use in laminates (e.g. coffee packs).

EXAMPLE 9

Using the same composition as used for Example 7, thick (175–200 μm) biaxially oriented opaque film was produced at 105° C. using draw ratios of 3.3/1 in the longitudinal and transverse directions, and heat setting at 210° C.

The film had a density of 0.94 and showed very good dispersion and voiding. Possible applications for this type of film include photographic prints and identity cards.

We claim:

1. An opaque or translucent biaxially oriented film made from a composition which comprises at least one linear polyester and 0.5 to 100% by weight based on the weight of polyester of at least one olefine polymer, wherein said composition contains at least one carboxylated polyolefine in an amount of 0.05 to 50% by weight based on the weight of olefine polymer.

2. A film according to claim 1 wherein said composition comprises 0.5 to 20% by weight based on the weight of polyester of at least one olefine polymer.

3. A film according to claim 1 wherein said composition comprises 0.5 to 20% by weight based on the weight of olefine polymer of at least one carboxylated polyolefine.

4. A film according to claim 1 wherein the at least one polyester is polyethylene terephthalate.

5. A film according to claim 1 wherein the at least one olefine polymer is an olefine homopolymer or copolymer selected from one or more of polyethylene, polypropylene, poly-4-methylpentene and ethylene/propylene copolymer.

6. A film according to claim 1 wherein the carboxylated polyolefine is an oxidised olefine homopolymer.

7. A film according to claim 1 wherein the carboxylated polyolefine has a Brookfield Viscosity (140° C.) in the range 150 to 100,000 cps and an Acid Number in the range 5 to 200 mg KOH/g.

8. A film according to claim 1 which is heat set.

9. A film according to claim 1 wherein to form the composition used for the film the at least one olefine polymer and the at least one carboxylated polyolefine are precompounded and then mixed with the at least one polyester.

* * * * *